United States Patent

Stay

(10) Patent No.: US 8,224,932 B2
(45) Date of Patent: Jul. 17, 2012

(54) DEPLOYMENT OF REMOTE PORTLETS INTO A PORTAL

(75) Inventor: Andreas Stay, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 12/362,478

(22) Filed: Jan. 29, 2009

(65) Prior Publication Data

US 2010/0192146 A1 Jul. 29, 2010

(51) Int. Cl.
*G06F 15/177* (2006.01)
(52) U.S. Cl. ........ 709/221; 709/201; 709/202; 709/203; 709/217; 709/219; 709/211
(58) Field of Classification Search .................. 709/221, 709/201, 202, 203, 217, 219, 211
See application file for complete search history.

(56) References Cited

U.S. PATENT DOCUMENTS

| | | | |
|---|---|---|---|
| 2003/0167315 A1* | 9/2003 | Chowdhry et al. | 709/218 |
| 2007/0005726 A1* | 1/2007 | Allamaraju et al. | 709/218 |
| 2009/0171720 A1* | 7/2009 | Crook et al. | 705/7 |
| 2010/0094703 A1* | 4/2010 | Bramley et al. | 705/14.45 |

* cited by examiner

*Primary Examiner* — Lan-Dai T Truong
(74) *Attorney, Agent, or Firm* — Cantor Colburn LLP; Ayla Lari (57) ABSTRACT

A method and system for deploying remote portlet applications into a portal. The system includes a portal server in communication with a client, and including a portal which includes a portlet which receives a request from a user, via the client, to install a portlet application from a remote location, searches for a selected remote portlet application as selected by the user, and triggers an installation of the selected remote portlet application when selected for installation by the user, and a deployment application programming interface (API) which communicates with the portlet and deploys the selected remote portlet application to the portal when triggered by the portlet.

3 Claims, 6 Drawing Sheets

DEPLOYMENT OF REMOTE PORTLETS INTO A PORTAL

BACKGROUND

The present invention relates to deploying portlets into a portal, and more specifically, to deploying portlets into a portal by direct use of a portlet catalog via the portal.

Figure 1:
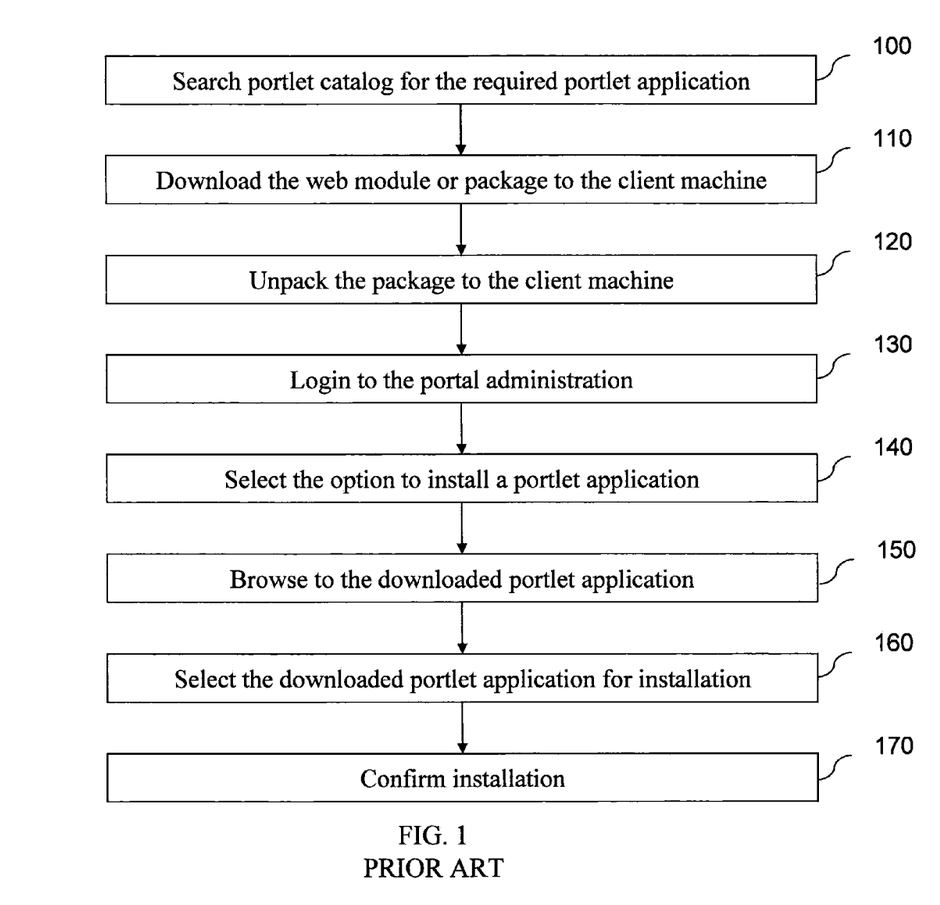
FIG. 1 is a flowchart illustrating a conventional method of deploying portlets.
Figure 2:
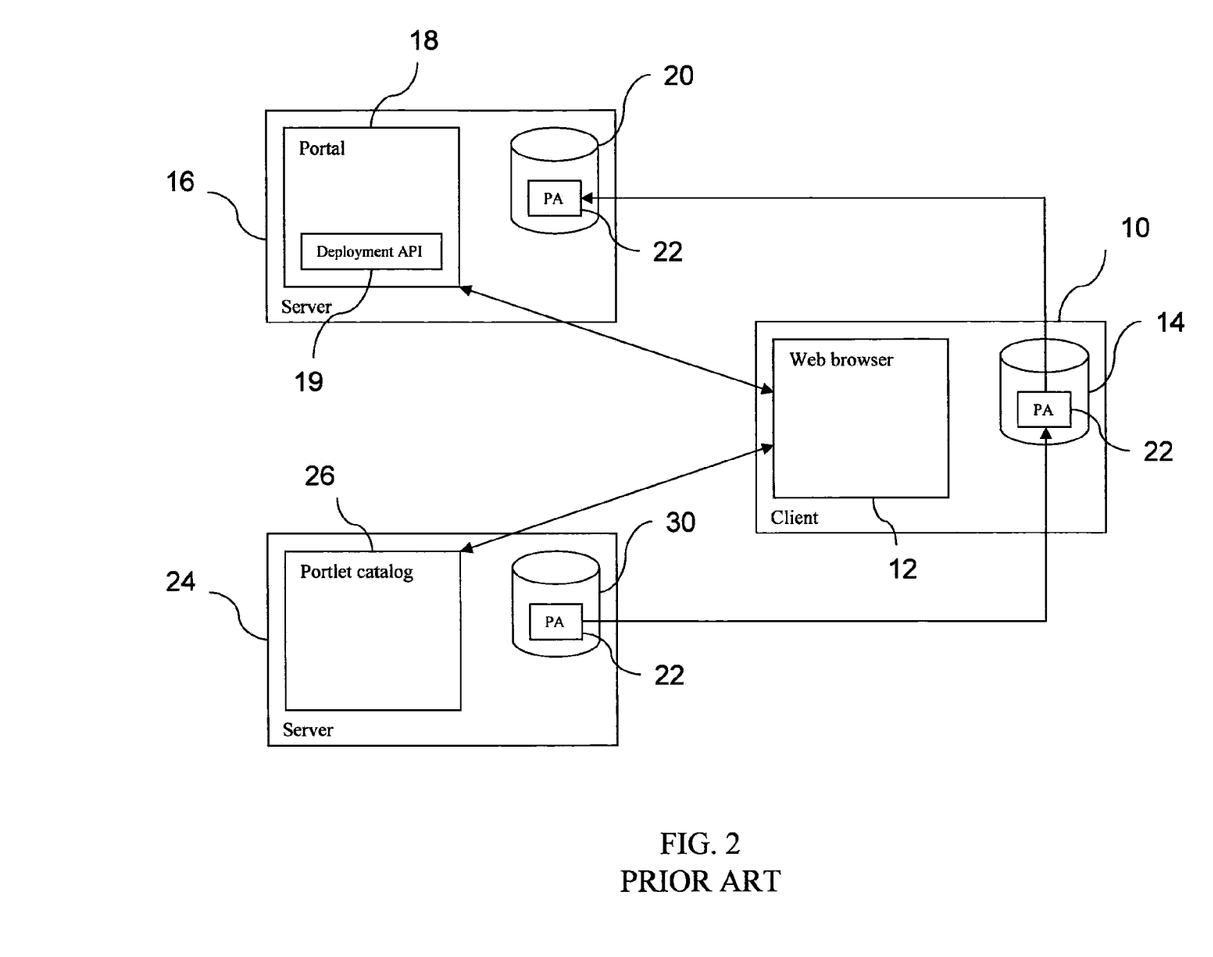
FIG. 2 is a block diagram illustrating a conventional portal system performing the method shown in FIG. 1.

Portal software enables the ability to execute applications to render parts of a portal page. These applications are called portlets. Portlets provide a variety of information such as current time, stock price of a company or a weather forecast, for example. These types of portlets are interesting for many customers of a portal since they provide a useful task. Today, portlet applications can be downloaded from special websites such as portlet catalogs. The portlet catalogs include a collection of web pages, which are categorizing and describing the downloadable portlet applications. Together with the description of a portlet application, a link to the web module or package is provided. This link can be used to download the portlet application. FIG. 1 illustrates a conventional method for deploying portlets. As shown in FIG. 1, in operation 100 a portlet catalog is searched for a required portlet application. A web module or package is then downloaded to the client machine at operation 110. At operation 120, the package is unpacked to the client machine. Then, in operation 130, a user/administrator logs into the portal administration. The user then selects an option to install a portlet application at operation 140 and browses to the downloaded portlet application at operation 150. Then, the user selects the downloaded portlet application for installation at operation 160 and the installation is confirmed at operation 170. FIG. 2 is a conventional system employing the method of FIG. 1.

In FIG. 2, the system includes a client machine 10 and a plurality of servers 16 and 24. The client machine 10 includes a web browser 12 and a storage device 14. The server 16 includes a portal 18 having a deployment application programming interface (API) 19 and a storage device 20. The server 24 includes a portlet catalog 26 and a storage device 30. At a client machine 10, a user/administrator searches the portlet catalog 26 on the server 24 for specified portlet applications, using the web browser 12. The portlet catalog 26 provides download links to portlet applications 22. These links are used to download a portlet application 22 from the storage device 30 of the server 24 to a storage device 14 of the client machine 10. After the portlet application 22 is downloaded, the user connects to the server 16 running the portal 18 and initiates the deployment of the selected portal application 22 via the deployment API 19. During the deployment, the portlet application 22 is copied from the storage device 14 of the client machine 10 to the storage device 20 of the server 16. If the portlet application is a package, e.g., a ZIP file, the user must first unpack it on the client machine 10.

There are several problems associated with the conventional method for deploying remote portlets. One problem is that the portal software does not have the ability to deploy these portlet applications without requiring the user to first download or unpack the portlet application from the portlet catalog to the client machine. This process may be very time-consuming since the user has to connect to two different servers as shown in FIG. 2, and handle intermediate files which have to be stored on the client machine only for transfer purposes.

SUMMARY

The present invention provides a method for directly deploying remote portlets from a portlet catalog by providing a portlet and an extended deployment API in the portal and routing all requests to the portlet catalog through the portal, thereby eliminating the need to connect to multiple servers and to handle intermediate files.

According to an embodiment of the present invention, a computer-implemented system for deploying remote portlet applications into a portal is provided. The system includes a portal server in communication with a client, and including a portal which includes a portlet which receives a request from a user, via the client, to install a portlet application from a remote location, searches for a selected remote portlet application as selected by the user, and triggers an installation of the selected remote portlet application when selected for installation by the user, and a deployment application programming interface (API) which communicates with the portlet and deploys the selected remote portlet application to the portal when triggered by the portlet.

According to another embodiment of the present invention, a method for deploying portlets is also provided.

Additional features and advantages are realized through the techniques of the present invention. Other embodiments and aspects of the invention are described in detail herein and are considered to be a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 3:
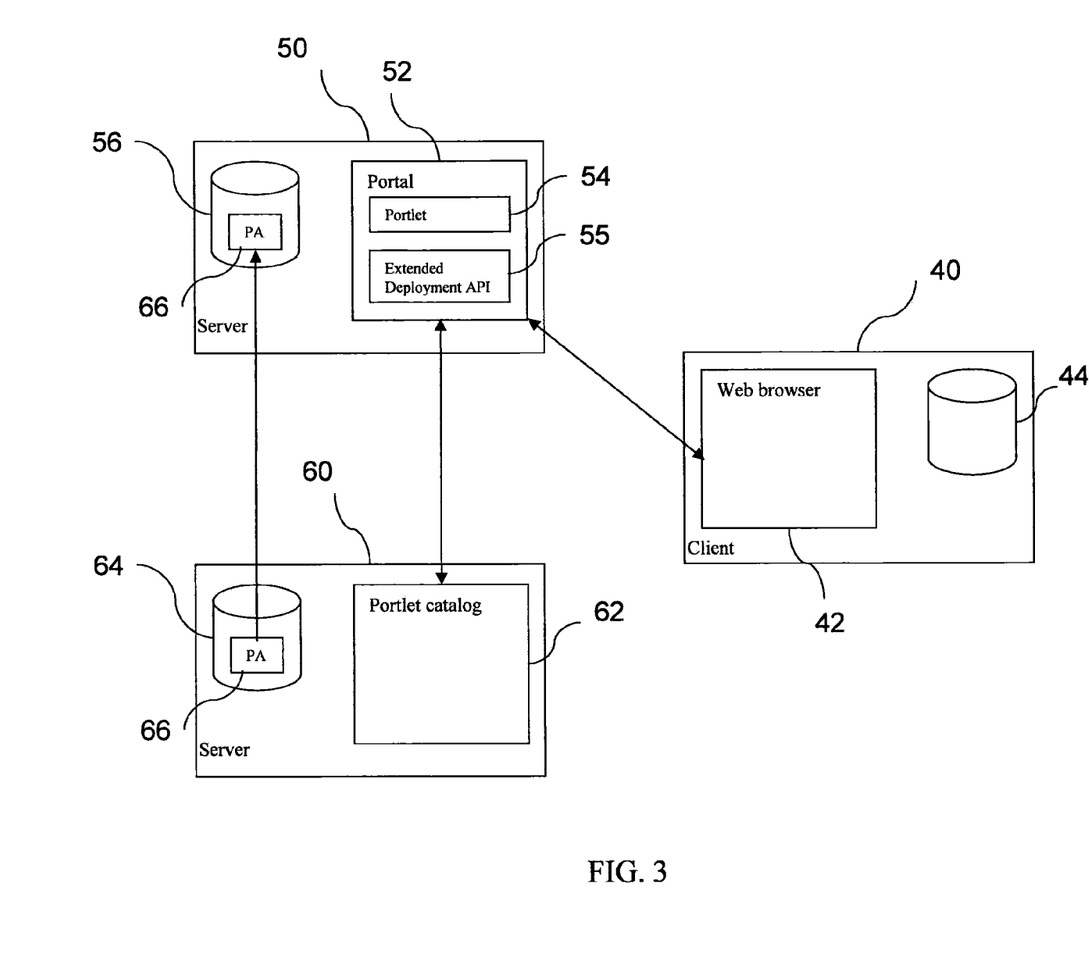
FIG. 3 is a block diagram illustrating a system that can be implemented within embodiments of the present invention.
Figure 5:
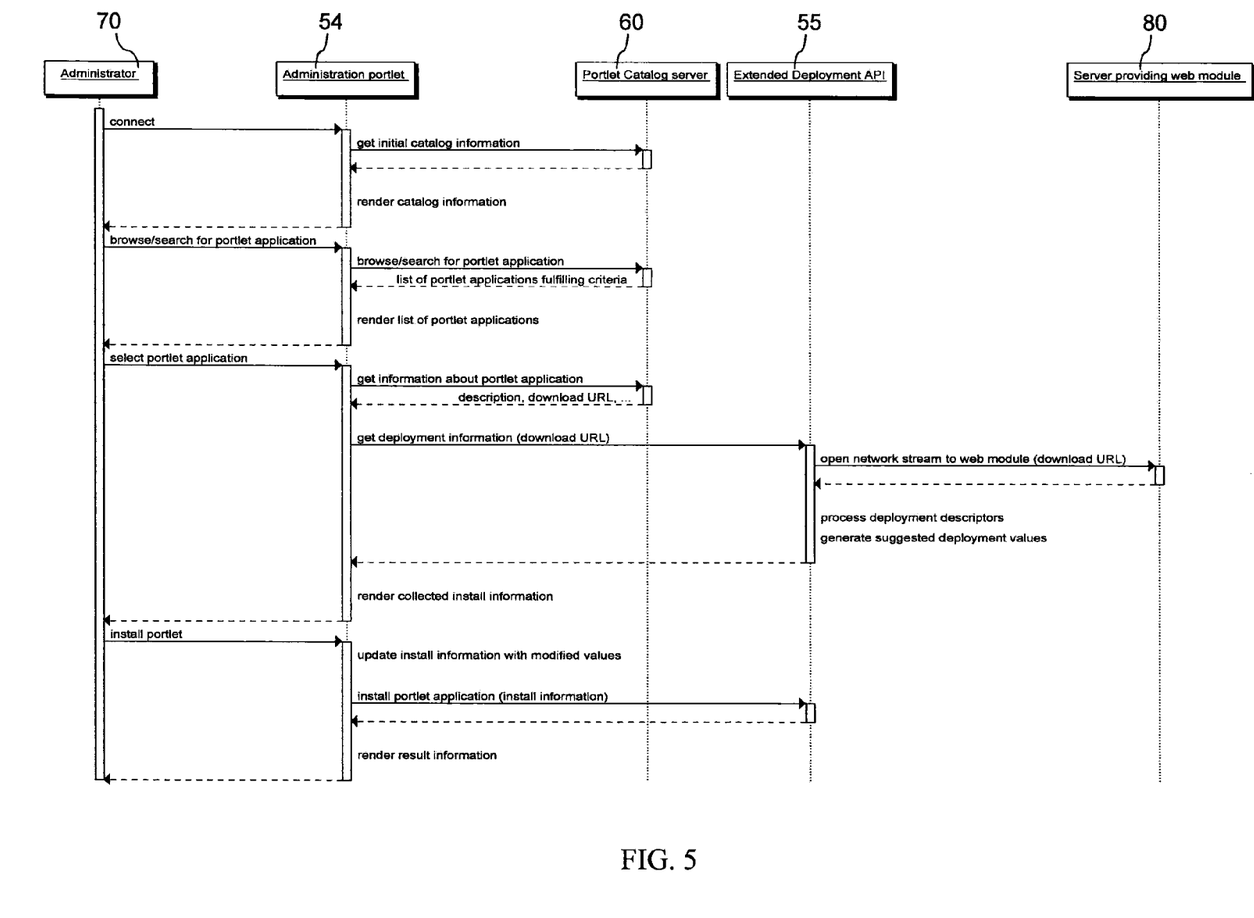
FIG. 5 is a sequence diagram illustrating interactions within the system shown in FIG. 3 that can be implemented within embodiments of the present invention.

With reference now to FIG. 3, there is a block diagram illustrating a system for deploying portlet applications into a portal, according to an embodiment of the present invention. As shown in FIG. 3, the system includes a client machine 40 and a plurality of servers 50 and 60. The client machine 40 includes a web browser 42 and a storage device 44. The server 60 includes a portlet catalog 62 and a storage device 64 storing portlet applications 66. The server 50 includes a portal 52 and a storage device 56. According to an embodiment of the present invention, the portal 52 includes a portlet 54 and an extended deployment API 55. The user (e.g., an administrator 70 as depicted in FIG. 5, for example) connects with the portal 52 via the web browser 42 at the client machine 40 and uses the portlet 54 to access the portlet catalog 62. That is, the portlet 54 allows the user to browse the portlet catalog 62 and to select a portlet application 66 for installation. Therefore, according to an embodiment of the present invention, the user only directly connects to the server 50 which runs the portal 52.

According to an embodiment of the present invention, the portlet 54 receives a request from a user, via the client machine 40, to install a portlet application 66, accesses and searches a portlet catalog 62 of the server 60 for a selected portlet application 66 as selected by the user. The portlet 54 also provides install information for installing the selected portlet application 66 and triggers an installation of the selected portlet application 66 when selected for installation by the user.

According to an embodiment of the present invention, the portlet 54 also enables the use of techniques such as web services or remote portlets (WSRP), for example, to provide a portlet catalog.

According to an embodiment of the present invention, the extended deployment API 55 is used to install portlet applications 66 from a network location, and is used by the portlet 54 to deploy any selected portlet application 66. That is, the extended deployment API 55 is extended to support the installation of portlet applications 66 from remote network locations, for example. Therefore, upon selection of a portlet application 66 via the portlet 54, the portlet 54 triggers the extended deployment API 55 to deploy the selected portlet application 66. That is, the extended deployment API 55 receives the install information provided by the portlet 54, and retrieves the selected portlet application 66 based on the install information received. Alternatively, according to another embodiment, the extended deployment API 55 may be used to download the web module or package directly from the remote server (reference numeral 80) as shown in FIG. 5, for example, to the server 50 and then perform a deployment operation. According to another embodiment, the download functionality may be included in the portlet 54, for example, as discussed below with reference to FIG. 6.

The portlet application 66 is then directly installed from the portlet catalog 62 at the server 60, without requiring the user to first download the portlet application 66 to the client machine 40. Instead, the portlet application 66 is directly installed from the storage device 64 at the server 60 to the storage device 56 at the server 50, for example. According to an embodiment of the present invention, the selected portlet application 66 may be stored on a disk or in memory, for example.

According to embodiments of the present invention, there are different ways to access the portlet catalog 62. According to one embodiment, the portlet catalog 62 may be a web pages-based portlet catalog where the portlet 54 embeds the web pages and converts any download link to a portlet application 66 into a portlet URL. Therefore, when the portlet URL is selected, the installation of the portlet application 66 is triggered.

According to another embodiment, the portlet catalog 62 may be a data-based portlet catalog, where the server 60 provides a file which categorizes and describes the portlet applications 66 and provides the download links. In this embodiment, the format of the file may be an XML format, for example, however, the present invention is not limited hereto. The portlet 54 renders the content of the file appropriately and implements a search function. The download links are embedded as portlet URLs, for example, which triggers the installation of the selected portlet application 66. Alternatively, the portlet applications 66 may be provided in a selectable list at the portlet 54 where the user may select to install all selected portlet applications 66 by clicking an install link, for example.

According to yet another embodiment, the portlet catalog 62 may be a web service-based portlet catalog where the server 60 offers a web service which provides access to the portlet catalog 62 and a search function. Web service operations may be used to navigate the portlet catalog 62 or search for specific portlet applications 66. Download links may be embedded as portlet URLs, for example, to trigger the installation of the selected portlet application 66. Alternatively, according to another embodiment, the portlet applications 66 may be provided in a selectable list at the portlet 54, as mentioned above, and the user may click an install link to install all selected portlet applications 66.

In yet another embodiment of the present invention, the portlet catalog 62 may be a WSRP-based portlet catalog, where the server 60 offers a remote portlet (not shown) which implements a user interface, navigation, and logic of the portlet catalog 62. The remote portlet (not shown) is consumed by the portal 52, for example. In order to install the portlet applications 66 from the portlet catalog 62, a local portlet such as portlet 54 is required. The local portlet 54, for example, then handles the installation request and communicates with the respective extended deployment API 55. By selecting a portlet application 66 in the remote portlet, this event triggers the local portlet 54, for example. The local portlet 54 provides an install link and installs the portlet application 66 when the install link is selected, for example.

Figure 4:
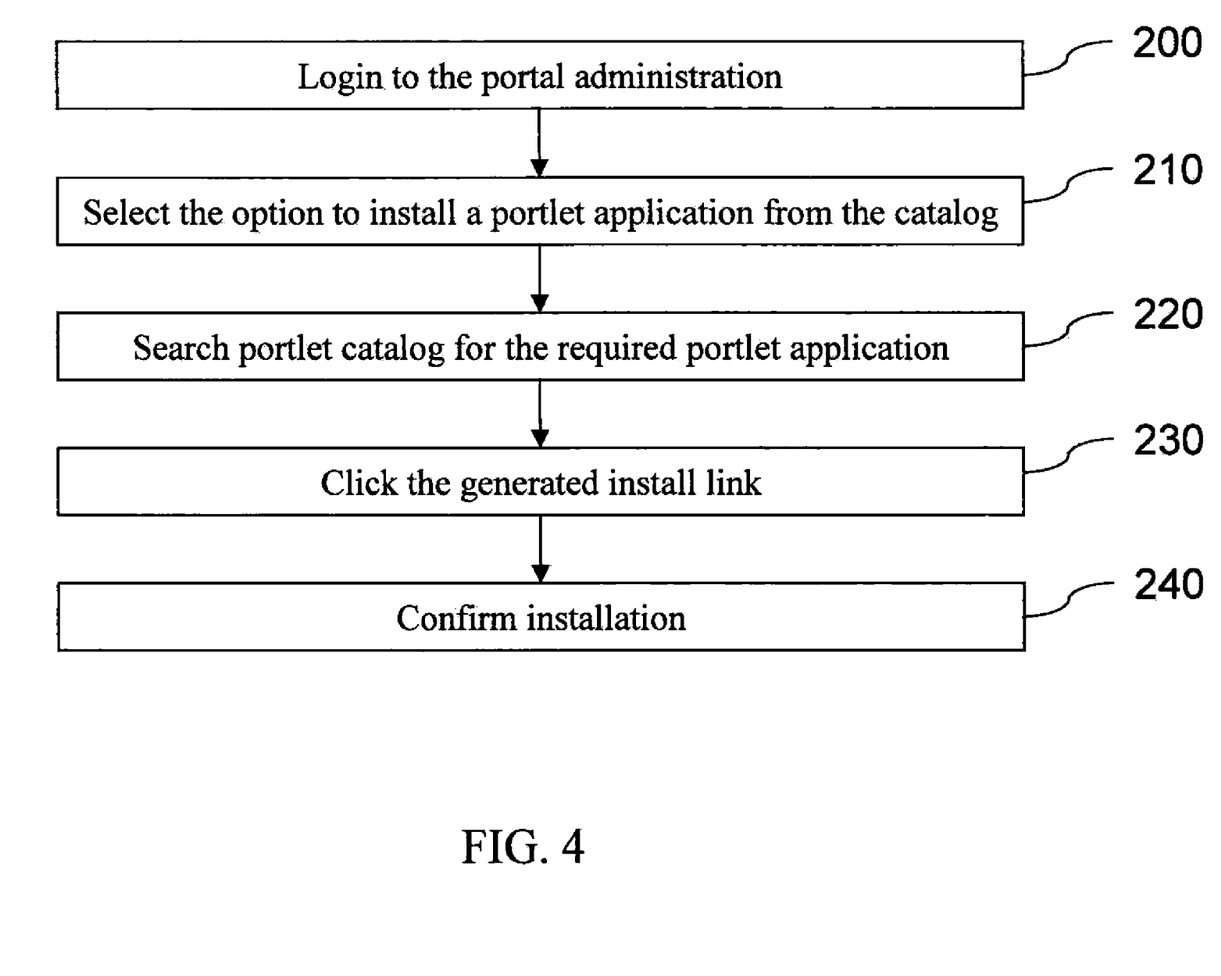
FIG. 4 is a flowchart illustrating a method for deploying portlets that can be implemented within embodiments of the present invention

FIG. 4 is a flowchart illustrating a method for deploying portlets via the system shown in FIG. 3, according to an embodiment of the present invention. As shown in FIG. 4, a flowchart illustrating a method for deploying portlets according to an embodiment of the present invention. As shown in FIG. 4, at operation 200, the user/administrator logs into the portal administration. From operation 200, the process moves to operation 210 where the user selects an option to install a portlet application from a portlet catalog. From operation 210, the process moves to operation 220, where the user searches the portlet catalog for portlet applications fulfilling his search criteria via the system which performs the search and generates an associated install link such as a portlet uniform resource locator (URL). A detailed description of interactions within the system shown in FIG. 3 will be discussed below in reference to FIG. 5. From operation 220, the process moves to operation 230, where the user clicks on the generated install link. From operation 230, the process then moves to operation 240 where the installation of the portlet application is confirmed.

FIG. 5 is a sequence diagram illustrating interactions within the system shown in FIG. 3 that can be implemented within embodiments of the present invention. As shown in FIG. 5, a user/administrator 70 connects to the administration portlet 54 and the portlet 54 (i.e., the administration portlet 54) obtains initial catalog information such as a portlet catalog welcome page, for example, from the server 60 (i.e., the portlet catalog server 60). The initial catalog information is returned to the administration portlet 54 and is rendered to the administrator 70. The administrator 70 then browses/searches for a portlet application 66 and the administration portlet 54 acts as a proxy for the administrator 70 and browses the portlet catalog 62 for available portlet applications 66 or searches the portlet catalog 62 for a specific portlet application 66, for example. Thus, the administrator 70 communicates with the administration portlet 54 instead of directly using the portlet catalog 62, and the administration portlet 54 sends appropriate requests to the portlet catalog 62 and renders the responses of the portlet catalog 62, appropriately. The portlet catalog server 60 returns a list of available portlet applications 66 which meet search criteria as specified by the administrator 70, to the administration portlet 54. The administration portlet 54 then renders the list of portlet applications 66 to the administrator 70. The administrator 70 then selects a portlet application 66 from the list, and the administration portlet 54 retrieves information, if provided, regarding the selected portlet application 66 from the portlet catalog server 60. The server 60 returns portlet information including a description and a download link, for example, to the administration portlet 54. The administration portlet 54 converts the download link to the portlet application 66 into a portlet URL, for example, using the download link as a parameter. The selection of the portlet URL triggers the installation of the selected portlet application 66.

According to an embodiment, if the administrator 70 decides to install the portlet application 66 and selects the associated portlet URL, the administration portlet 54 triggers the installation. The administration portlet 54 then obtains deployment information using the download URL for example, from the extended deployment API 55. The deployment information may include portlet application information such as the predetermined number and name of portlets embedded in the selected portlet application 66. The extended deployment API 55 opens a network stream to a web module located on a server 80 containing the selected portlet application 66, using the download link. The extended deployment API 55 then process deployment descriptors and generates deployment information including suggested deployment values and returns the install information including the deployment information to the administration portlet 54. The administration portlet 54 then renders the collected install information to the administrator 70 and allows the administrator 70 to modify the deployment information associated with the selected portlet application 66, if necessary. The administrator 70 then selects to install the portlet application 66 by clicking on an install link, for example. The administration portlet 54 then updates the install information with any modified values, as modified by the administrator 70 and triggers the extended deployment API 55 with the install information to install the selected portlet application 66. After deployment of the selected portlet application 66, the administration portlet 54 displays the result information returned from the extended deployment API 55 and the administrator 70 may either continue to browse the portlet catalog 62 for other portlet applications 66 or may end the browsing process. The present invention is not limited to the extended deployment API 55 retrieving the selected portlet application 66 from the server 80. An alternative embodiment of the present invention will now be described below with reference to FIG. 6.

Figure 6:
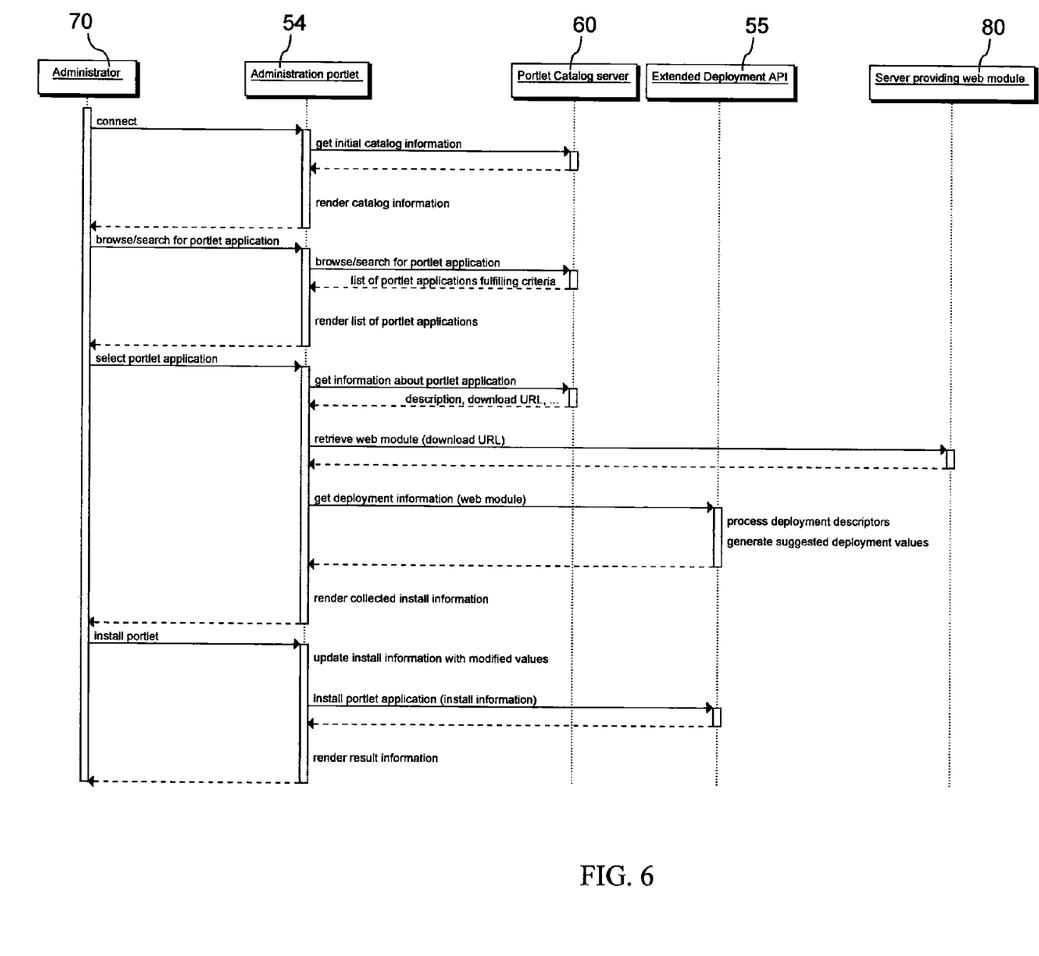
FIG. 6 is a sequence diagram illustrating interactions within the system shown in FIG. 3 that can be implemented within alternative embodiments of the present invention

FIG. 6 is a sequence diagram illustrating interactions within the system shown in FIG. 3 that can be implemented within alternative embodiments of the present invention. As shown in FIG. 6, the user/administrator 70 connects to the administration portlet 54 and the administration portlet 54 obtains the initial catalog information from the portlet catalog server 60. The initial catalog information is returned to the administration portlet 54 and is rendered to the administrator 70. The administrator 70 then browses/searches for a portlet application 66 and the administration portlet 54 acts as a proxy for the administrator 70 and browses the portlet catalog 62 for available portlet applications 66 or searches the portlet catalog 62 for a specific portlet application 66, for example. The portlet catalog server 60 returns a list of available portlet applications 66 which meet search criteria as specified by the administrator 70, to the administration portlet 54. The administration portlet 54 then renders the list of portlet applications 66 to the administrator 70. The administrator 70 then selects a portlet application 66 from the list, and the administration portlet 54 retrieves information, if provided, regarding the selected portlet application 66 from the portlet catalog server 60. The server 60 returns portlet information including a description and a download link, for example, to the administration portlet 54. According to the current embodiment, the administration portlet 54 then retrieves the web module located on the server 80 containing the selected portlet application 66, using the download link. The administration portlet 54 obtains deployment information, using the web module, from the extended deployment API 55 which processes deployment descriptors and generates deployment information including suggested deployment values and returns the install information including the deployment information to the administration portlet 54. The administration portlet 54 then renders the collected install information to the administrator 70 and allows the administrator 70 to modify the deployment information associated with the selected portlet application 66, if necessary. The administrator 70 then selects an option to install the portlet application 66 by clicking on an install link, for example. The administration portlet 54 then updates the install information with any modified values, as modified by the administrator 70 and triggers the extended deployment API 55 with the install information to install the selected portlet application 66. After deployment of the selected portlet application 66, the administration portlet 54 displays the result information returned from the extended deployment API 55 and the administrator 70 may either continue to browse the portlet catalog 62 for other portlet applications 66 or may end the browsing process.

The method for deploying remote portlets according to embodiments of the present invention enables a user to use the portlet catalog without the need to leave the portal environment or to handle intermediate files. Therefore, the present invention provides the advantage of installing a portlet application from the portlet catalog faster and more efficiently.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. Some embodiments of the invention may be downloaded as a computer program, which may be transferred from a remote computer (e.g., a server) to a requesting computer (e.g., a client) by way of data signals embodied in a carrier wave or other propagation medium via a communication link (e.g., a modem or network connection).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented system for directly deploying remote portlet applications into a portal, the computer-implemented system comprising:
    a portal server device in communication with a client machine;
    the portal server device comprises a hardware storage device, and a portal;
    the portal including an administration portlet and a deployment application programming interface (API);
    the administration portlet which receives a request from a user, via the client machine, to install a portlet application selected from a portlet catalog which is embedded as web page and stored in a remote location from the portal server device, searches for a selected remote portlet application as selected by the user, and triggers an installation of the selected remote portlet application on the client machine when selected for installation by the user; and
    the deployment application programming interface (API) which communicates with the administration portlet and deploys the selected remote portlet application to the portal when triggered by the administration portlet;
    the administration portlet obtains portlet information corresponding to the selected remote portlet application and obtains deployment information from the deployment application programming interface (API) based on the portlet information obtained, wherein the portlet information comprises at least one of a description and a download link embedded as portlet URL;
    wherein, the deployment application programming interface (API) opens a network stream to a web module located on a server containing the selected portal application by using the download link to retrieve the selected remote portlet application, the deployment application programming interface (API) processes deployment descriptors and generates install information corresponding to the selected remote portlet application and forwards the install information to the administration portlet, the administration portlet then provides the received install information to the user to select an option to install selected portlet applications by clicking on an install link.

2. The computer-implemented system of claim 1, wherein the administration portlet opens a network stream to a server providing web module to retrieve the selected remote portlet application, using the portlet information and the deployment application programming interface API generates install information corresponding to the selected remote portlet application and forwards the install information to the administration portlet.

3. The computer-implemented system of claim 1, wherein the administration portlet receives generated install information from the deployment application programming interface API and provides the install information to the user, and the deployment application programming interface API installs the selected remote portlet application when the user selects an option to install the selected portlet application.

* * * * *